(No Model.)
P. G. GARDNER, Jr.
ELECTRICAL CONDUCTOR.
No. 306,478. Patented Oct. 14, 1884.
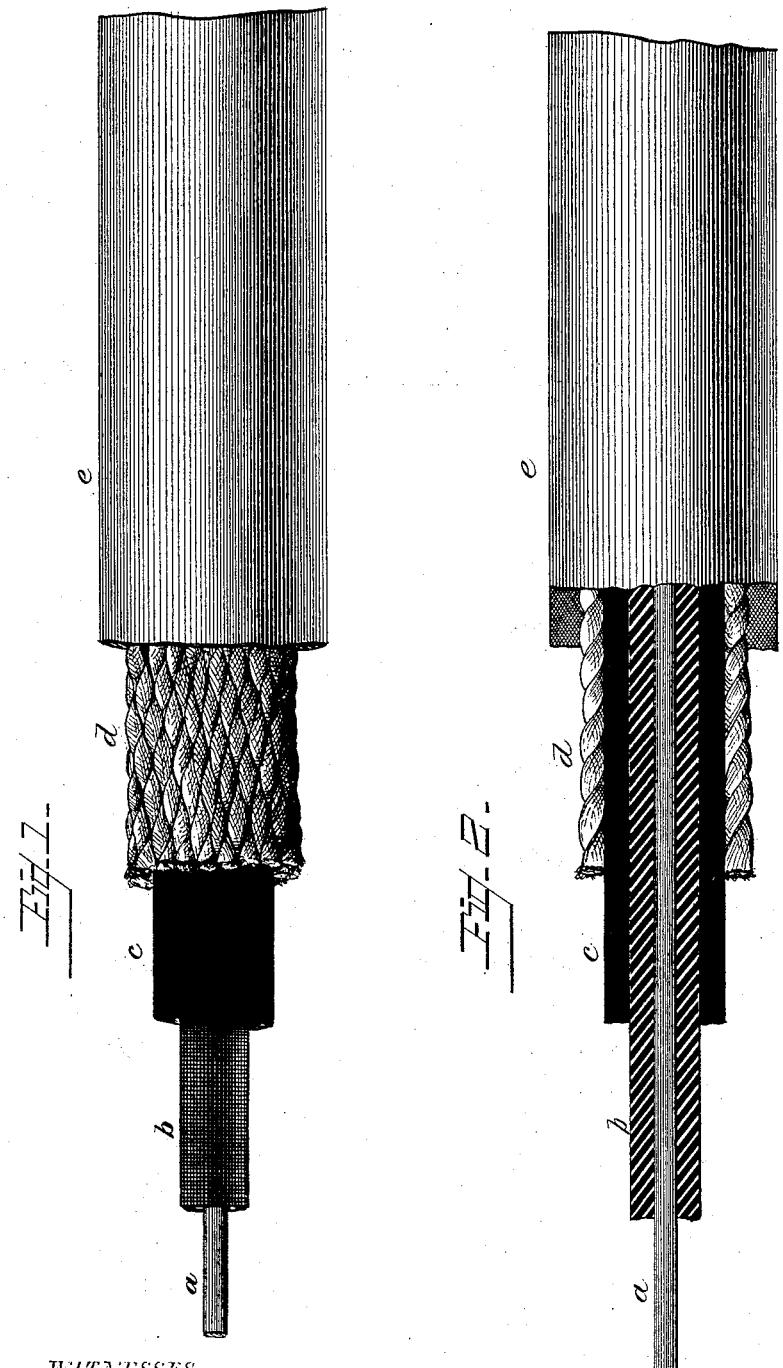
WITNESSES
Franck L. Ourand
Geo. H. Rundel
INVENTOR
Perry G. Gardner Jr.
by A. L. Smith
Attorney

UNITED STATES PATENT OFFICE.

PERRY G. GARDNER, JR., OF NORTH ADAMS, MASSACHUSETTS, ASSIGNOR OF ONE-HALF TO GILES K. TINKER, OF SAME PLACE.

ELECTRICAL CONDUCTOR.

SPECIFICATION forming part of Letters Patent No. 306,478, dated October 14, 1884.

Application filed February 4, 1884. (No model.)

*To all whom it may concern:*

Be it known that I, PERRY G. GARDNER, Jr., of North Adams, county of Berkshire, State of Massachusetts, have invented a new and useful Improvement in Electrical Conductors, of which the following is a full, clear, and exact description, reference being had to the accompanying drawings, making part of this specification.

My invention relates to an improved insulated conductor of electricity, and to the arrangement of the insulating and protecting coating relatively to said conductor; and it consists in coating the conductor proper, which may be of any usual or preferred material employed for that purpose, with an insulating coating of gutta-percha or balata applied directly to the surface of the wire or other form of conductor employed, then covering the insulating gutta-percha or balata with a coating of india-rubber or rubber compound, over which is braided a covering of fibrous material, the conductor thus insulated and protected being lastly passed through a bath of mineral or vegetable tar mixed with chloride and oxide of zinc, with the temperature of the bath raised to a boiling-point, as hereinafter explained.

In the accompanying drawings, Figure 1 represents a side elevation of my improved conductor, with the several coatings broken away in succession at one end; and Fig. 2 is a similar view with the several coatings partly in section.

The drawings show the arrangement of the several coatings referred to, which, with the conductor, may be described, in connection with said drawings, as follows:

*a* represents the wire, which, as above stated, may be of any preferred material.

*b* represents the first coating, which is of gutta-percha, applied directly to the surface of the wire, and as the manner of applying a coating of gutta-percha, and also of the other materials hereinafter named, is well understood, it need not be herein described.

Gutta-percha is well known as being one of the best non-conductors of electricity while it remains in its natural condition, or that which it assumes when first applied to the wire; but when exposed to atmospheric changes it soon becomes changed into a resinous condition, becoming dry and brittle, and freezing readily, in which condition it cracks and is easily broken, and its non-conducting property, to a great extent, disappears. Balata is similar in its nature to gutta-percha, and may be used in lieu thereof. By covering and protecting it as hereinafter described, I am enabled to keep it in its natural soft and pliable condition, in which it adheres closely to the surface of the wire, and is not liable to slip thereon, thereby obviating the necessity of tinning the surface of the wire, as is done when rubber or rubber compound is used. I now cover the gutta-percha or balata with a coating, *c*, of rubber or rubber compound, the latter being in itself a good non-conductor, and less liable than the gutta-percha to be affected by extremes of heat and cold under exposure, and thus forming a good protecting-covering to the gutta-percha or balata. The rubber covering is also impervious to water, which is important for the protection of the gutta-percha. If the rubber coating be protected by a covering of fibrous material rendered non-inflammable, it will withstand great extremes of heat and cold. I therefore braid over said rubber coating a coating of fibrous material, (indicated at *d*,) and then pass the conductor through a bath of vegetable or mineral tar mixed with chloride and oxide of zinc to render it non-inflammable, and brought up to or nearly to the temperature at which it will boil, at which it will penetrate and fill the pores of the braid coating, forming a final coating, (indicated at *e*.) The braid covering and the covering of mineral or vegetable tar mixed with the chloride and oxide of zinc, penetrating and covering said braid covering, serve to fully protect the rubber coating, and, in connection with the latter, to protect the inner coating of gutta-percha or balata thoroughly from atmospheric changes and making it durable—a property which, taken in connection with its superior non-conducting property, its cheapness, and the ease with which it can be applied, makes it very desirable as a coating for electric conductors.

I would state that I am aware that the several materials named for coating have been employed, but not that they have been used together arranged as hereinabove described.

Having now described my invention, I claim as new—

An electrical conductor provided with a coating of gutta-percha or balata, a coating of rubber or rubber compound applied over the gutta-percha or balata, a covering of fibrous material braided on the rubber coating, and a coating of mineral or vegetable tar mixed with chloride and oxide of zinc, penetrating and covering the braid coating, all substantially as described.

In testimony whereof I have hereunto set my hand this 16th day of January, A. D. 1884.

PERRY G. GARDNER, Jr.

Witnesses:
CHARLES J. PARKHURST,
MARK E. COUCH.